(12) United States Patent
Wilke et al.

(10) Patent No.: US 9,604,499 B2
(45) Date of Patent: Mar. 28, 2017

(54) COMPRESSION MOLDED HUB SHELL

(71) Applicants: Mark Wilke, Oconomowoc, WI (US); Graham Wilhelm, Madison, WI (US)

(72) Inventors: Mark Wilke, Oconomowoc, WI (US); Graham Wilhelm, Madison, WI (US)

(73) Assignee: Trek Bicycle Corporation, Waterloo, WI (US)

(*) Notice: Subject to any disclaimer, the term of this patent is extended or adjusted under 35 U.S.C. 154(b) by 0 days.

(21) Appl. No.: 14/191,774

(22) Filed: Feb. 27, 2014

(65) Prior Publication Data
US 2014/0239708 A1    Aug. 28, 2014

Related U.S. Application Data

(60) Provisional application No. 61/769,806, filed on Feb. 27, 2013.

(51) Int. Cl.
*B60B 27/04*    (2006.01)
*B60B 27/02*    (2006.01)
*B60B 5/02*    (2006.01)

(52) U.S. Cl.
CPC ............. *B60B 27/023* (2013.01); *B60B 5/02* (2013.01); *B60B 27/04* (2013.01); *B60B 2310/204* (2013.01); *B60B 2360/341* (2013.01); *B60B 2900/00* (2013.01)

(58) Field of Classification Search
CPC ... B60B 27/023; B60B 5/02; B60B 2310/204; B60B 2360/341; B60B 2360/3412; B60B 2360/3414; B60B 2360/3416; B60B 2360/3418
See application file for complete search history.

(56) References Cited

U.S. PATENT DOCUMENTS

| | | | |
|---|---|---|---|
| 4,058,581 A * | 11/1977 | Park | B29C 70/04 156/166 |
| 4,937,032 A * | 6/1990 | Krone | B29C 70/08 156/242 |
| 2001/0054840 A1* | 12/2001 | Schlanger | B60B 1/003 301/59 |

* cited by examiner

*Primary Examiner* — Erez Gurari

(57) ABSTRACT

An apparatus including a hub shell. The hub shell can include a hub body; a first spoke flange; and a second spoke flange. The first spoke flange and the a second spoke flange can include a fiber reinforced plastic. The fiber reinforced plastic can include fibers having a range of lengths between 0.2 and 3 inches.

11 Claims, 6 Drawing Sheets

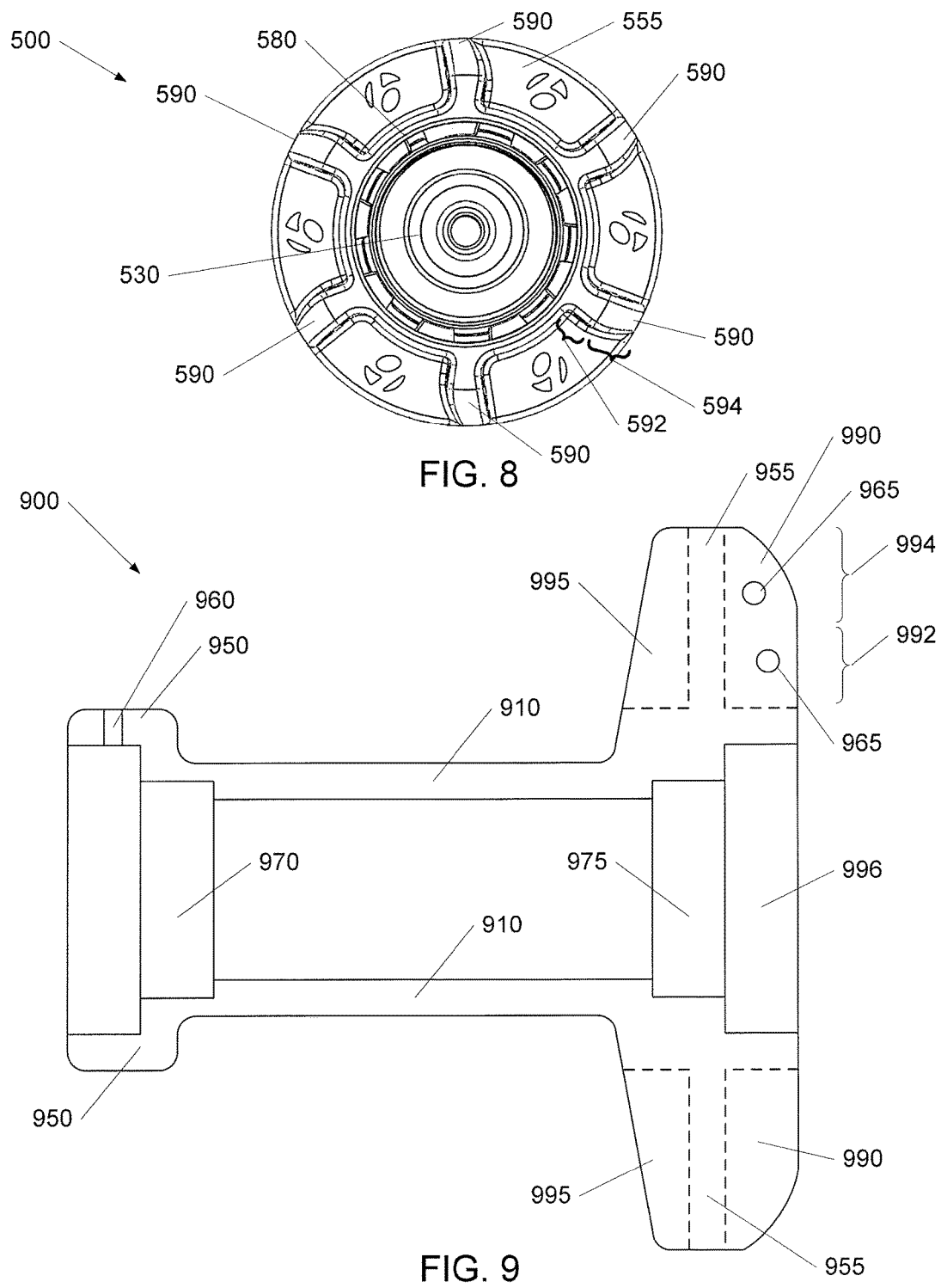

COMPRESSION MOLDED HUB SHELL

CROSS-REFERENCE TO RELATED PATENT APPLICATIONS

This application claims the benefit of U.S. Provisional Application No. 61/769,806, filed Feb. 27, 2013, titled "COMPRESSION MOLDED HUB SHELL," which is incorporated herein by reference in its entirety.

BACKGROUND

The present invention relates generally to the field of bicycle hubs and more particularly to the field of hub shells.

SUMMARY

One illustrative embodiment is related to an apparatus including a hub shell. The hub shell can include a hub body; a first spoke flange; and a second spoke flange. The first spoke flange and the second spoke flange can include a fiber reinforced plastic. The fiber reinforced plastic can include fibers having a range of lengths between 0.2 and 3 inches.

Another illustrative embodiment is related to a method. The method can include providing a high precision mold for at least a portion of a hub shell. Fiber reinforced plastic can be placed in the mold. The fibers of the fiber reinforced plastic can have a range of lengths between 0.2 and 3 inches. The high precision mold can be heated and compressed.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 8 is a side view of the drive side of the rear hub assembly of FIG. 5 in accordance with an illustrative embodiment.

FIG. 9 is a section view of a hub shell in accordance with an illustrative embodiment.

DETAILED DESCRIPTION OF THE ILLUSTRATIVE EMBODIMENTS

Figure 1:
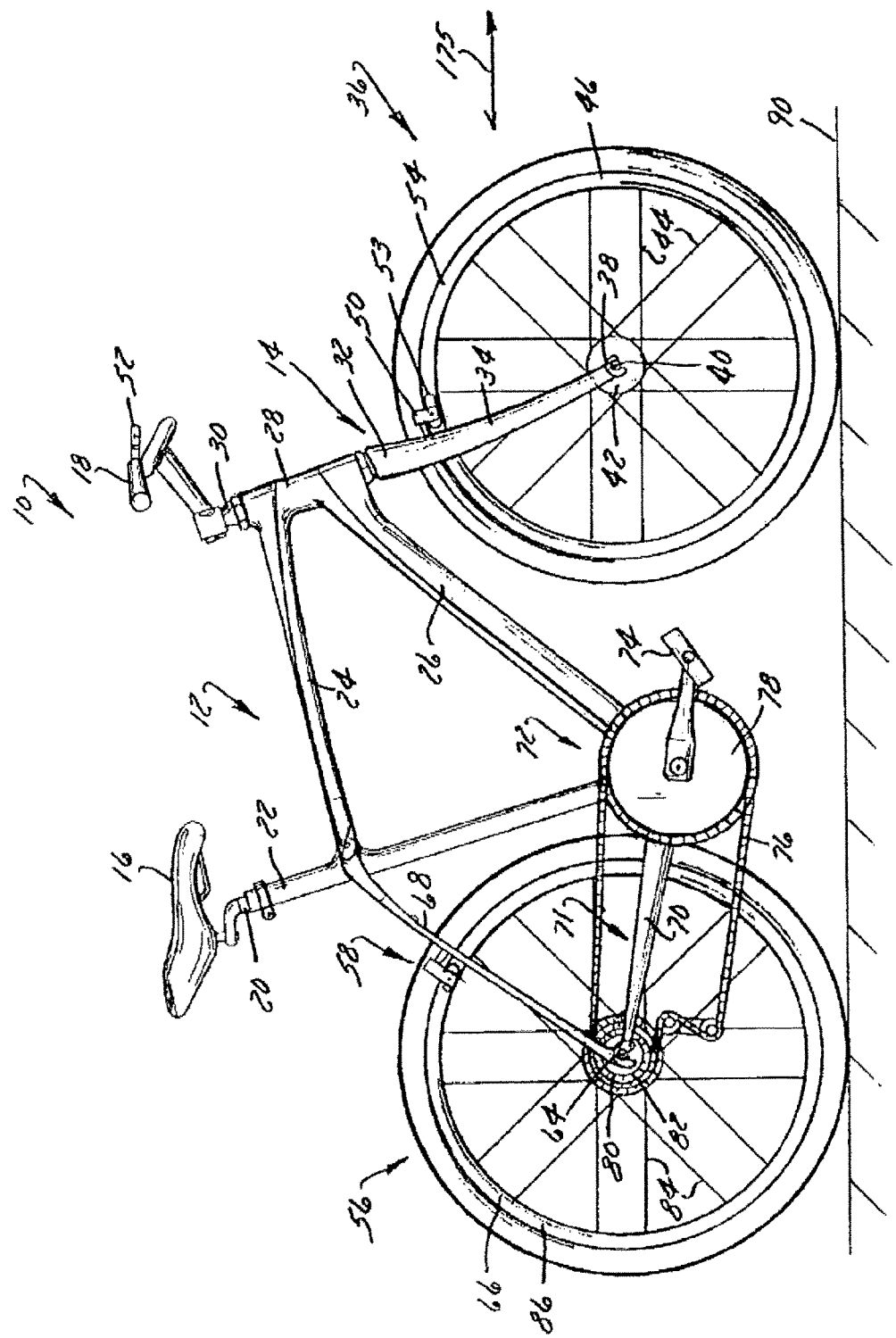
FIG. 1 is a side view of a bicycle in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is directed to an enhanced bicycle braking surface and method of enhancing a bicycle braking surface. Referring to FIG. 1, a side view of a bicycle 10 in accordance with an illustrative embodiment is shown. The bicycle 10 can have a frame assembly 12. The bicycle 10 can include a seat 16 and handlebars 18 that are attached to frame assembly 12. A seat post 20 can be connected to seat 16 and can slidably engage a seat tube 22 of the frame assembly 12. A top tube 24 and a down tube 26 can extend forwardly from the seat tube 22 to a head tube 28 of the frame 12. Handlebars 18 can be connected to a stem or steer tube 30 that can pass through the head tube 28 and can be connected or integrally formed with a fork crown 32. The handlebar 18 can include a stem that is constructed to slidably engage an interior cavity of the steer tube 30. One or more of the structures of bicycle 10 and frame assembly 12 can be constructed from similar materials, a variety of different materials, and various combinations thereof. The frame assembly 12 and seat tube 22 can be formed of metal-type materials, such as steel, aluminum-type materials, fiber reinforced plastic, carbon fiber materials, and/or materials that are sufficiently formable and robust enough to support a rider of bicycle 10.

A fork assembly 14 can include a pair of fork blades or fork legs 34 that can extend from generally opposite ends of a fork crown 32 and can be constructed to support a front wheel assembly 36 at an end thereof or a dropout 38. The dropouts 38 can engage generally opposite sides of an axle 40 constructed to engage a hub 42 of the front wheel assembly 36. The hub 42 can be, for example, a freehub or a freewheel hub. A number of spokes 44 can extend from hub 42 to a rim 46 of the front wheel assembly 36. A tire 48 can be engaged with rim 46 such that rotation of the hub 42 and the rim 46, relative to the fork legs 34, rotates the tire 48. The rim 46 can be covered with a brake material, in part or in its entirety, to enhance braking characteristics.

The bicycle 10 can include a front brake assembly 50 having an actuator 52 attached to handlebars 18 and a pair of brake pads 53 positioned on generally opposite sides of front wheel assembly 36. The brake pads 53 can be constructed to engage a brake wall 54 of the rim 46 thereby providing a stopping or slowing force to front wheel assembly 36. A rear wheel assembly 56 can include a brake assembly 58 similar to the front wheel brake assembly 50. Brake assemblies 50, 58 can be any brake configuration such as, but not limited to, a rim brake or disk brake assembly wherein a rotor and a caliper are positioned proximate one or more of front wheel axle 40 or a rear axle 64, respectively. The rotor can be covered with a brake material, in part or in its entirety, to enhance braking characteristics. A rear wheel 66 can be positioned generally concentrically about rear axle 64.

A pair of seat stays 68 (FIG. 2) and a pair of chain stays 70, 71 can extend rearward relative to the seat tube 22 and the offset rear axle 64 from a crankset 72. The crank set 72 can include a set of pedals 74 that can be operationally connected to a flexible drive member such as a chain 76 via one or more variable diameter chain gears or a chain ring or sprocket 78. Rotation of chain 76 can communicate a drive force to a gear cluster 80 positioned proximate rear axle 64. The gear cluster 80 can be generally concentrically orientated with respect to the rear axle 64 and can include a number of variable diameter gears.

The gear cluster 80 can be operationally connected to a hub 82 of the rear wheel 66. The hub 82 can be, for example, a freehub or a freewheel hub. A number of spokes 84 can extend radially between the hub 82 and a rim 86 of rear wheel 66 of rear wheel assembly 56. The rim 86 can be covered with a brake material. Rider operation of the pedals 74 can drive the chain 76 thereby driving the rear wheel 66 which in turn propels the bicycle 10. The fork assembly 14 can be constructed to support a forward end 88 of the bicycle 10 above a ground surface 90. The handlebar 18 can be connected to the frame 12 and the fork assembly 14 such that operator manipulation of the handlebar 18 can be communicated to the fork assembly 14 to facilitate rotation of the front wheel assembly 36 relative to the frame assembly 12 along a longitudinal axis, indicated by arrow 175, of the bicycle 10. Manipulation of the handlebar 18 can steer the bicycle 10 during riding.

The construction of bicycle 10 depicted in FIG. 1 is merely exemplary of a number of bicycle configurations. Whereas bicycle 10 is shown as what is commonly understood as a street or road bike, the present disclosure is applicable to a number of bicycle configurations including those bicycles with more aggression suspension systems commonly found in off-road or mountain bike frame configurations, and/or hybrids, cross-over or multi-purpose bicycle frame configurations.

Figure 2:
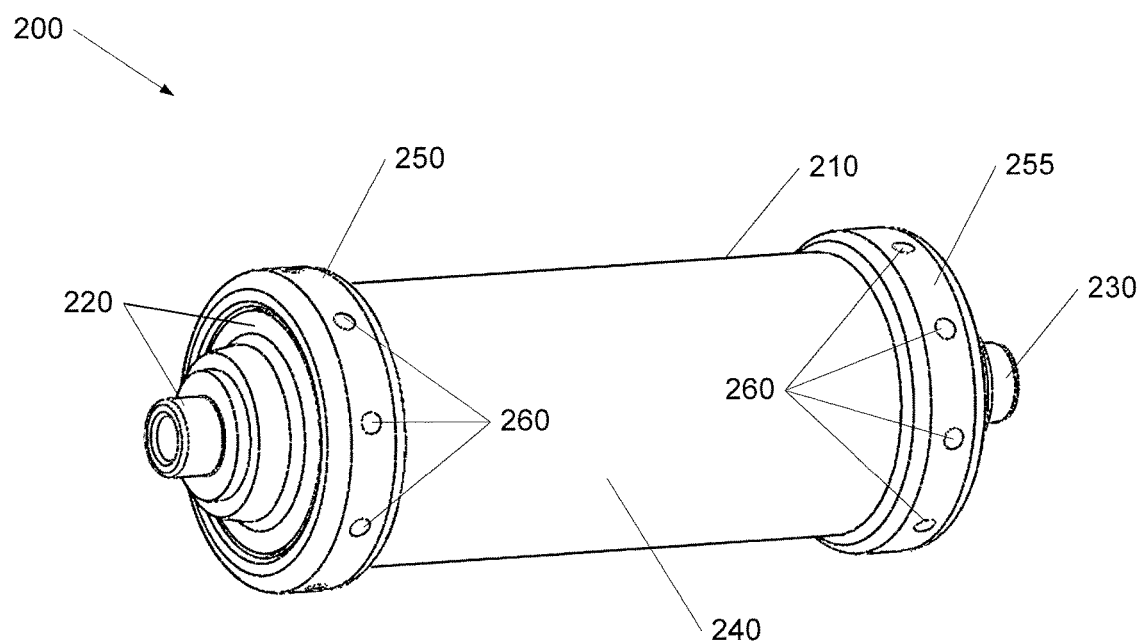
FIG. 2 is a perspective view of a front hub assembly in accordance with an illustrative embodiment.
Figure 3:
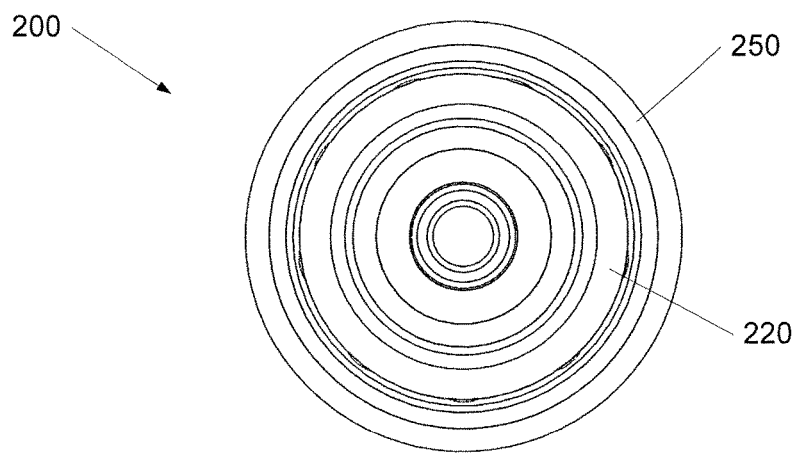
FIG. 3 is a side view of the front hub assembly of FIG. 2 in accordance with an illustrative embodiment.

Referring to FIG. 2, a perspective view of a front hub assembly 200 in accordance with an illustrative embodiment is shown. Referring to FIG. 3, a side view of the front hub assembly 200 of FIG. 2 in accordance with an illustrative embodiment is shown. The front hub assembly 200 can include a hub shell 210, a first end cap 220, and a second end cap 230. The first end cap 220 and the second end cap 230 can thread onto an axle (not shown). The first end cap 220 and the second end cap 230 can cover a first bearing (not shown) and a second bearing (not shown). The first bearing and the second bearing can sit between the axle and hub shell 210. Hence, hub shell 210 can be free to rotate around the axle.

The hub shell 210 can include a hub shell body 240, a first spoke flange 250 and a second spoke flange 255. The hub shell body 240, can be a cylindrical shape, however, any shape can be used. The first spoke flange 250 and the second spoke flange 255 can be located at the ends of the hub shell body 240. The first spoke flange 250 and the second spoke flange 255 can include spoke holes 260. Spokes (not shown) can be inserted through the spoke holes 260 and connected to a rim (not shown). The spoke holes 260 can include countersinking to bury the ends of the spokes. The first spoke flange 250 and the second spoke flange 255 can reinforce the ends of the hub shell 210. For example, the first spoke flange 250 and the second spoke flange 255 can be thicker than the hub shell body 240. The first spoke flange 250 and the second spoke flange 255 can include ribs to further reinforce the ends of the hub shell 210. The hub shell body 240 can be about 3 inches long with an average diameter of about 1.25 inches; however, any dimensions can be used.

In one illustrative embodiment, the hub shell 210 can be molded as one piece. Features such as the spoke holes 260 can be drilled after molding. Alternatively, the first spoke flange 250 and the second spoke flange 255 can be separately molded and bonded to the hub shell body 240, which can be a tube made of, for example, fiber reinforced or metal. The hub shell 210 can be made of fiber reinforced plastic. The fiber can be a carbon fiber. In other embodiments, fibers such as aramid (e.g., Kevlar™), fiberglass, boron fibers, ceramic fibers, nylon, or any other fiber can be used. The fiber can be a combination of fibers. A resin system of the fiber reinforced plastic can be, for example, an epoxy. The resin can be fortified with particulate, nanotubes, fibers, and nanostructures. In one embodiment, the fiber reinforced plastic can be a thermoses. In another embodiment, the fiber reinforced plastic can be a thermoplastic. The hub shell 210 can include bismaleimide, polyphenylene sulfide, polyetherimide, polyamide, polyetheretherketone, polystyrene, nylon, polypropylene, polyethylene, vinyls, acrylics, and/or polycarbonates. In one embodiment, the resin can be chosen to have mechanical properties similar to aluminum.

The glass transition temperature (Tg) of the plastic/resin can be any temperature. In one embodiment, the resin can have a glass transition temperature (Tg) greater than 265 degrees Fahrenheit. In another embodiment, the Tg of the resin can be greater than 310 or 340 degrees Fahrenheit. In another embodiment, the Tg of the resin can be in a range of about 300 degrees Fahrenheit to about 420 degrees Fahrenheit. Plastic/resin with a glass transition temperature (Tg) greater than 310 degrees Fahrenheit can improve heat dissipation and thermal stability.

The chop of the fiber can be from a range from about 0.01 inches to about 3 inches. The chop of the fiber can be defined as the average length of a fiber. In another embodiment, chop of the fiber can be from a range from about 1 inch to about 2 inches. In another embodiment, chop of the fiber can be 1 inch. In another embodiment, chop of the fiber can be 2 inches. In another embodiment, the chop of the fiber can include a plurality of different lengths. For example, half of the fiber can have a 1 inch chop and half of the fiber can have a 2 inch chop. In another embodiment, the fiber can be inserted into a mold so that fibers of a predetermined chop are positioned to flow into particular areas of the mold. For example, smaller fibers can be positioned to flow into detailed features. In one embodiment, the fiber can be a prepreg, i.e., already covered with the resin.

The hub shell 210 can include a first bearing seat (not shown) and a second bearing seat (not shown). A bearing can include, for example, an outer race, an inner race, and bearing rollers located between the outer race and inner race. When the hub shell 210 and/or the ends of the hub shell are molded, the first bearing seat and second bearing seat mold features can be molded with a high precision mold configured according to a bearing manufacture's recommended bearing seat tolerances. In one example, a high precision mold can be a mold that results in a molding that has critical features, such as the bearing seat areas, that are within 0.5 mm. In another example, a high precision mold can be a mold that results in a molding that has critical features, such as the bearing seat areas, that are within 0.2 mm. In another example, a high precision mold can be a mold that results in a molding that is substantially ready for finishing, such as paint. When the resin and fiber chop are molded, the resin and fiber chop can flow into the precise features of the high precision mold. Thus, when the hub shell 210 is unmolded, the bearing seat will be ready to accept a bearing with no further machining required. In contrast, a molded long-strand carbon fiber is unable to conform to a small, high precision mold within the required tolerances to properly accept a bearing without further machining.

Figure 11:
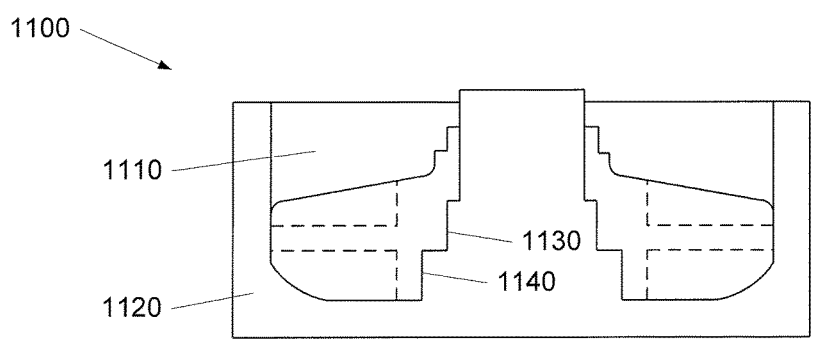
FIG. 11 is a section view of a hub shell mold in accordance with an illustrative embodiment.

In one embodiment, the fiber and resin can be placed in a heated compression mold. Referring to FIG. 11, a section view of a hub shell mold 1100 in accordance with an illustrative embodiment is shown. The hub shell mold 1100 can include a first portion 1110 and a second portion 1120; however, any number or configuration of portions can be used. The fiber and resin can be placed in hub shell mold 1100 between the first portion 1110 and the second portion 1120 and compressed.

The hub shell mold 1100 can be a high precision mold. The hub shell mold 1100 can include a bearing seat area 1130 and a drive ring seat area 1140. The bearing seat area 1130 and the drive ring seat area 1140 can be configured so that the tolerances of the corresponding areas of a molding are within 0.5 mm, 0.2 mm or less. The bearing seat area 1130 and the drive ring seat area 1140 can be packed with a chop of fiber, as described above, to result in the 0.5 mm, 0.2 mm or less tolerances. Similarly, aesthetic areas of the mold can be packed with a chop of fiber, as described above, to result in a molding that does not require substantial finishing. As the compression mold is heated the resin can begin to soften or melt. As pressure is applied to the compression mold, the resin and fibers can flow into the details of the mold.

In another embodiment, the fiber and resin can be weighed. The weight of the fiber and resin can be matched to the mold volume. The weighed fiber and resin can be placed in a compression mold and molded as above.

In another embodiment, the hub shell 210 can include a flange for attaching a disk brake rotor or a drum brake drum. Alternatively, mounting tabs can be integrated into the first spoke flange 250 and/or the second spoke flange 255.

Advantageously, the hub shell 210 can be as strong as an aluminum piece but 40% lighter. Advantageously, the hub shell 210 does not require additional machining to accept the first and second bearings thereby reducing manufacturing costs.

Figure 4:
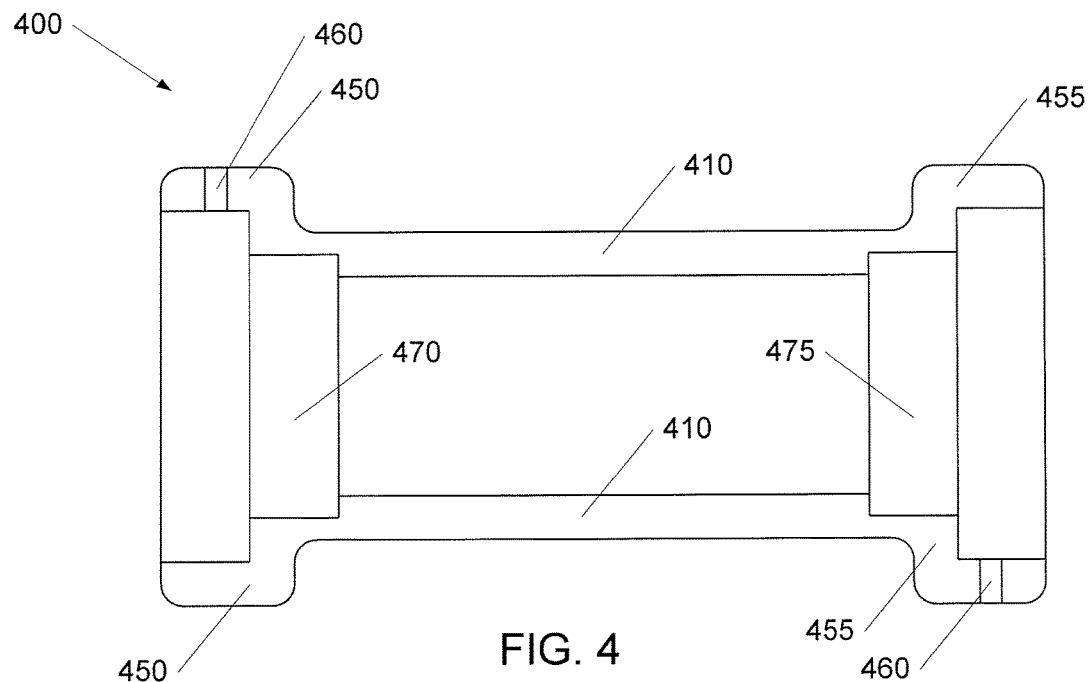
FIG. 4 is a section view of a hub shell in accordance with an illustrative embodiment.

Referring to FIG. 4, a section view of a hub shell 400 in accordance with an illustrative embodiment is shown. The hub shell 410 can include a hub shell body 440, a first spoke flange 450, a second spoke flange 255, and spoke holes 460, as described above.

The hub shell 400 can include a first bearing seat 470 and a second bearing seat 475. A bearing can include, for example, an outer race, an inner race, and bearings located between the outer race and inner race. In one example, the outer race of a first bearing can mate with or form an interference fit with the first bearing seat 470; and the outer race of a second bearing can mate with or form an interference fit with the second bearing seat 475. Alternatively, the hub shell 400 can be configured to using a single bearing or multiple bearings. In other embodiments, the bearing can be a taper bearing, a thrust bearing, or any other kind of bearing.

When the hub shell 410 and/or the ends of the hub shell are molded, the first bearing seat 470 and the second bearing seat 475 mold features can be molded with a high precision mold configured according to a bearing manufacture's recommended bearing seat tolerances. When the resin and fiber chop are molded, the resin and fiber chop can flow into the precise features of the high precision mold. Thus, when the hub shell 410 is unmolded, the first bearing seat 470 and the second bearing seat 475 will be ready to accept a bearing with no further machining required. In contrast, a molded long-strand carbon fiber is unable to conform to a small, high precision mold within the required tolerances to properly accept a bearing without further machining.

Advantageously, the hub shell 410 can be as strong as an aluminum hub shell but 40% lighter. Alternatively, the weight of the hub shell 410 can remain the same as an aluminum hub shell, yet be stronger. Advantageously, the hub shell 410 does not require additional machining to accept the bearings thereby reducing manufacturing costs.

Figure 5:
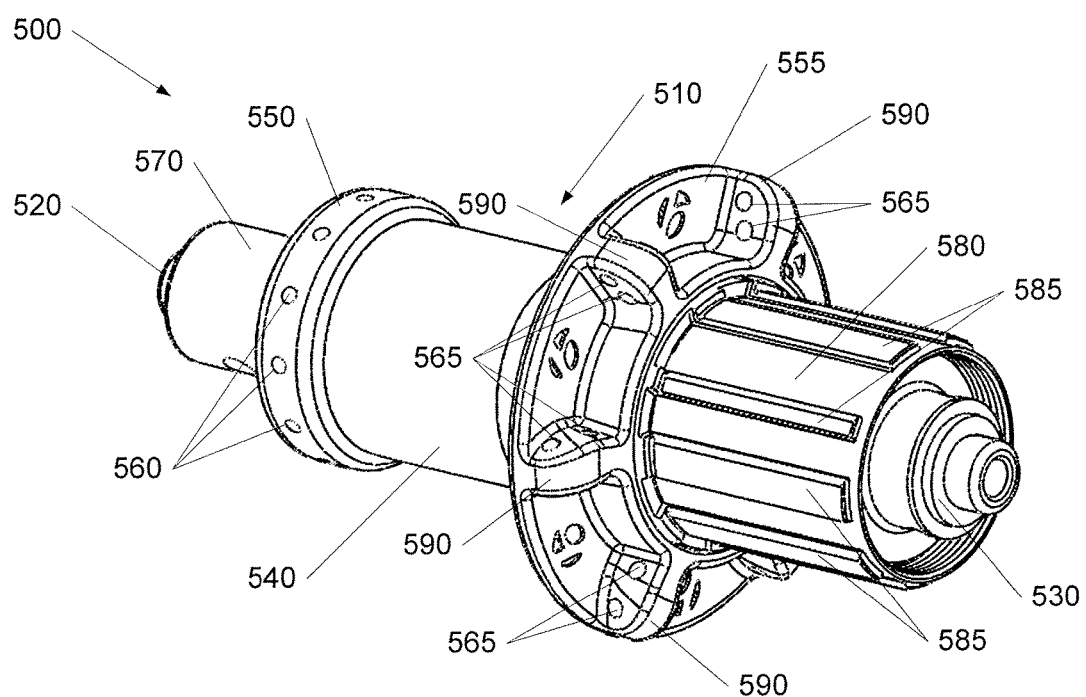
FIG. 5 is a perspective view of a drive side of a rear hub assembly in accordance with an illustrative embodiment.
Figure 6:
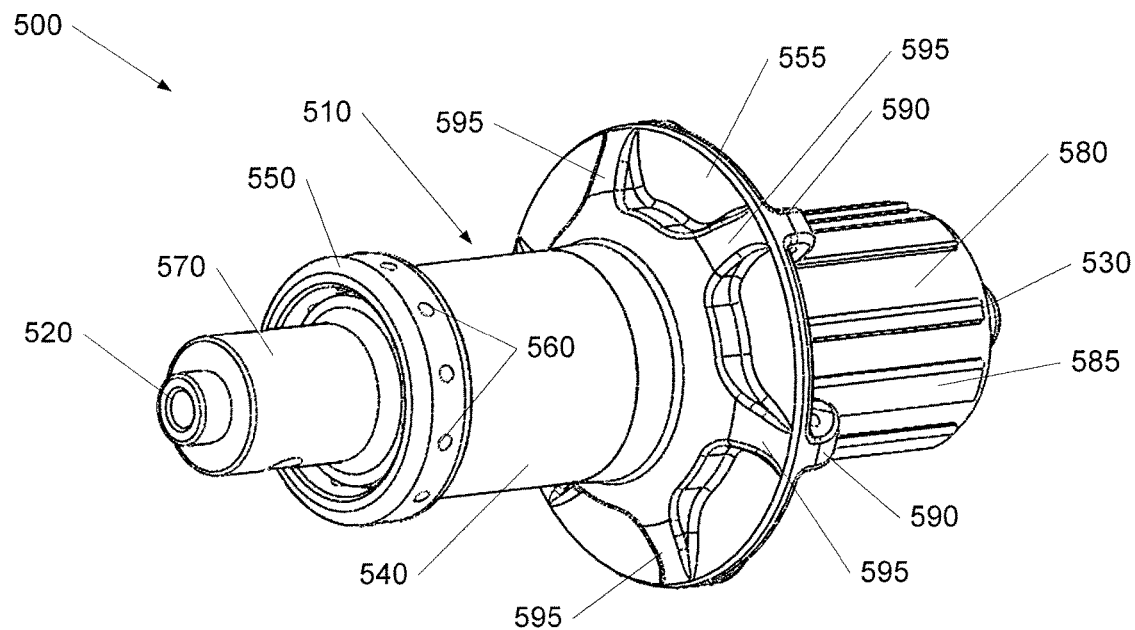
FIG. 6 is a perspective view of a non-drive side of the rear hub assembly of FIG. 5 in accordance with an illustrative embodiment.
Figure 7:
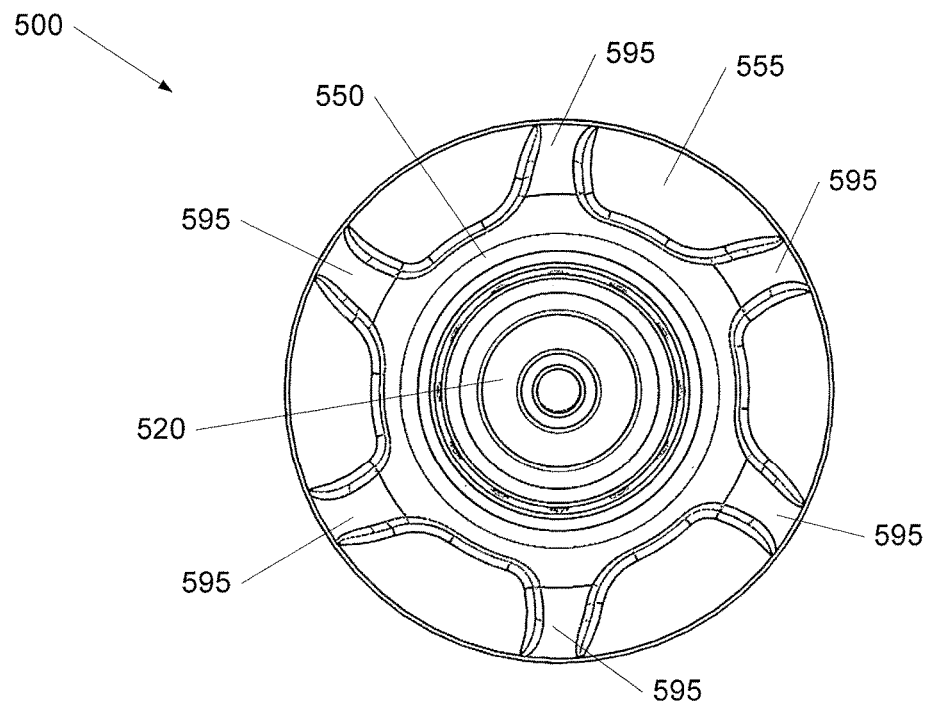
FIG. 7 is a side view of the non-drive side of the rear hub assembly of FIG. 5 in accordance with an illustrative embodiment.

Referring to FIG. 5, a perspective view of a drive side of a rear hub assembly 500 in accordance with an illustrative embodiment is shown. Referring to FIG. 6, a perspective view of a non-drive side of the rear hub assembly 500 of FIG. 5 in accordance with an illustrative embodiment is shown. Referring to FIG. 7, a side view of the non-drive side of the rear hub assembly 500 of FIG. 5 in accordance with an illustrative embodiment is shown. Referring to FIG. 8, a side view of the drive side of the rear hub assembly 500 of FIG. 5 in accordance with an illustrative embodiment is shown. The rear hub assembly 500 can include a hub shell 510, a first end cap 520, a second end cap 530, an axle 570, and a cassette body 580. The cassette body 580 can include splines 585. The first end cap 520 and the second end cap 530 can thread onto the axle 570. The first end cap 520 and the second end cap 530 can cover a first bearing (not shown) and a fourth bearing (not shown). The first bearing and a second bearing (not shown) can sit between the axle 570 and hub shell 510. Hence, hub shell 510 can be free to rotate around the axle 570. A third bearing (not shown) and the fourth bearing can sit between the axle 570 and the cassette body 580. Hence, cassette body 580 can be free to rotate around the axle. The cassette body 580 can include pawls (not shown) configured to engage a drive ring (not shown) of the hub shell 510. The pawls and the drive ring can operate so that in one direction, the cassette body 580 and the hub shell 510 are engaged; in the other direction, the cassette body 580 and the hub shell 510 are disengaged.

The hub shell 510 can include a hub shell body 540, a first spoke flange 550 and a second spoke flange 555. The hub shell body 540, can be a cylindrical shape, however, any shape can be used. The first spoke flange 550 and the second spoke flange 555 can be located at the ends of the hub shell body 540. The first spoke flange 550 can include spoke holes 560. The second spoke flange 555 can include spoke holes 565. Spokes (not shown) can be inserted through the spoke holes 560, 565 and connected to a rim (not shown). The spoke holes 560, 565 can include countersinking to bury the ends of the spokes. The first spoke flange 550 and the second spoke flange 555 can reinforce the ends of the hub shell 510. For example, the first spoke flange 550 and the second spoke flange 555 can be thicker than the hub shell body 540. The first spoke flange 550 and the second spoke flange 555 can include ribs to further reinforce the ends of the hub shell 510. The hub shell body 540 can be about 3 inches long with an average diameter of about 1.25 inches; however, any dimensions can be used.

The first spoke flange 550 can be located on the non-drive side and the second spoke flange 555 can be located on the drive side. The drive side can mean the side on which the cassette body 580 is located. The cassette body 580 can be configured to hold a cassette which can be driven by a chain.

The second spoke flange 555 can have a radius of about twice the radius of the hub shell body 540; however, the second spoke flange 555 can have any radius. In one embodiment, the second spoke flange 555 can have a radius of about 1.25 inches (i.e., a diameter of about 2.5 inches). In one embodiment, the second spoke flange 555 can be about 0.2 inches thick; however, the second spoke flange 555 can have any thickness.

The second spoke flange 555 can be designed to handle more stress than the first spoke flange 550. In many applications, the spokes associated with the second spoke flange 555 need to be under greater tension than the first spoke flange 550 so that the rear wheel will remain true under power. The second spoke flange 555 can be positioned father inboard than the first spoke flange 550.

The second spoke flange 555 can include first ribs 590 and second ribs 595. In one embodiment, the first ribs 590 and second ribs 595 can be aligned. In one embodiment, the spoke holes 565 can be located in the first ribs 590. The first ribs 590 can be curved like the blades of an impeller. In a first portion 592 of one of the first ribs 590, a first spoke can be attached at a first angle relative to the second spoke flange 555. In a second portion 594 of the one of the first ribs 590, a second spoke can be attached at a second angle relative to the second spoke flange 555. Alternatively, the first ribs 590 and second ribs 595 can be misaligned. In one embodiment, the spoke holes 565 can be located in the second ribs 595.

In one illustrative embodiment, the hub shell 510 can be molded as one piece. Alternatively, the first spoke flange 550 and the second spoke flange 555 can be separately molded and bonded to the hub shell body 540, which can be a tube made of, for example, fiber reinforced or metal. The hub shell 510 can be made of fiber reinforced plastic. The fiber can be a carbon fiber. In other embodiments, fibers such as aramid (e.g., Kevlar™), fiberglass, boron fibers, ceramic fibers, nylon, or any other fiber can be used. The fiber can be a combination of fibers. A resin system of the fiber reinforced plastic can be, for example, an epoxy. The resin can be fortified with particulate, nanotubes, fibers, and nanostructures. In one embodiment, the fiber reinforced plastic can be a thermoset. In another embodiment, the fiber reinforced plastic can be a thermoplastic. The hub shell 510 can include bismaleimide, polyphenylene sulfide, polyetherimide, polyamide, polyetheretherketone, polystyrene, nylon, polypropylene, polyethylene, vinyls, acrylics, and/or polycarbonates. In one embodiment, the resin can be chosen to have mechanical properties similar to aluminum.

The glass transition temperature (Tg) of the plastic/resin can be any temperature. In one embodiment, the resin can have a glass transition temperature (Tg) greater than 265 degrees Fahrenheit. In another embodiment, the Tg of the resin can be greater than 310 or 340 degrees Fahrenheit. In another embodiment, the Tg of the resin can be in a range of about 300 degrees Fahrenheit to about 420 degrees Fahrenheit. Plastic/resin with a glass transition temperature (Tg) greater than 310 degrees Fahrenheit can improve heat dissipation and thermal stability.

The chop of the fiber can be from a range from about 0.01 inches to about 3 inches. The chop of the fiber can be defined as the average length of a fiber. In another embodiment, chop of the fiber can be from a range from about 1 inch to about 2 inches. In another embodiment, chop of the fiber can be 1 inch. In another embodiment, chop of the fiber can be 2 inches. In another embodiment, the chop of the fiber can include a plurality of different lengths. For example, half of the fiber can have a 1 inch chop and half of the fiber can have a 2 inch chop. In another embodiment, the fiber can be inserted into a mold so that fibers of a predetermined chop are positioned to flow into particular areas of the mold. For example, smaller fibers can be positioned to flow into detailed features. In one embodiment, the fiber can be a prepreg, i.e., already covered with the resin.

The hub shell 510 can include a first bearing seat (not shown) and a second bearing seat (not shown). A bearing can include, for example, an outer race, an inner race, and bearings located between the outer race and inner race. When the hub shell 510 and/or the ends of the hub shell are molded, the first bearing seat and second bearing seat mold features can be molded with a high precision mold configured according to a bearing manufacture's recommended bearing seat tolerances. When the resin and fiber chop are molded, the resin and fiber chop can flow into the precise features of the high precision mold. Thus, when the hub shell 510 is unmolded, the bearing seat will be ready to accept a bearing with no further machining required. In contrast, a molded long-strand carbon fiber is unable to conform to a small, high precision mold within the required tolerances to properly accept a bearing without further machining.

In one embodiment, the fiber and resin can be placed in a heated compression mold. As the compression mold is heated the resin can begin to soften or melt. As pressure is applied to the compression mold, the resin and fibers can flow into the details of the mold.

In another embodiment, the fiber and resin can be weighed. The weight of the fiber and resin can be matched to the mold volume. The weighed fiber and resin can be placed in a compression mold and molded as above.

In another embodiment, the hub shell 910 can include a flange or flanges for attaching a disk brake rotor or a drum brake drum. Alternatively, mounting tabs for a disk or drum can be integrated into the first spoke flange 950 and/or the second spoke flange 955.

Advantageously, the hub shell 510 can be as strong as an aluminum piece but 40% lighter. Advantageously, the hub shell 510 does not require additional machining to accept the first and second bearings thereby reducing manufacturing costs.

Referring to FIG. 9, a section view of a hub shell 900 in accordance with an illustrative embodiment is shown. The hub shell 900 can include a hub shell body 910, a first spoke flange 950, and a second spoke flange 955, as described above. The first spoke flange 950 and the second spoke flange 955 can be located at the ends of the hub shell body 910. The first spoke flange 950 can include spoke holes 960. The second spoke flange 955 can include spoke holes 965.

The second spoke flange 955 can include first ribs 990 and second ribs 995. In one embodiment, the first ribs 990 and second ribs 995 can be aligned. In one embodiment, the spoke holes 965 can be located in the first ribs 990. The first ribs 990 can be curved like the blades of an impeller. In a first portion 992 of one of the first ribs 990, a first spoke can be attached at a first angle relative to the second spoke flange 955. In a second portion 994 of the one of the first ribs 990, a second spoke can be attached at a second angle relative to the second spoke flange 955. Alternatively, the first ribs 990 and second ribs 995 can be misaligned. In one embodiment, the spoke holes 965 can be located in the second ribs 995.

The hub shell 900 can include a first bearing seat 970 and a second bearing seat 975. In one example, the outer race of a first bearing can mate with or form an interference fit with the first bearing seat 970; and the outer race of a second bearing can mate with or form an interference fit with the second bearing seat 975. Alternatively, the hub shell 900 can be configured to using a single bearing or multiple bearings.

In other embodiments, the bearing can be a taper bearing, a thrust bearing, or any other kind of bearing.

The hub shell 900 can include a drive ring seat 996. A drive ring can be defined as a ring with teeth facing inwards and configure to interact with the pawls of a cassette body. The drive ring can be made of aluminum, steel, titanium, any other metal, or an alloy thereof. Alternatively, the drive ring can be a composite or ceramic. In one example, a drive ring can mate with, key into, or form an interference fit with the drive ring seat 996. Alternatively, the drive ring can be bonded into the drive ring seat 996. Alternatively, the drive ring can be co-molded with the hub shell 900. Alternatively, the drive ring can be molded as part of the hub shell 900; reinforcing materials and fillers can be placed in the drive ring section of the mold before compression molding to toughen the drive ring pawl contact surface and strengthen the area. In another embodiment, a molded drive ring (part of the hub shell 900) can be plated to toughen the pawl contact surface.

When the hub shell 910 and/or the ends of the hub shell are molded, the first bearing seat 970, the second bearing seat 975, and drive ring seat 996 mold features can be molded with a high precision mold configured according to a bearing manufacture's recommended bearing seat tolerances. When the resin and fiber chop are molded, the resin and fiber chop can flow into the precise features of the high precision mold. Thus, when the hub shell 910 is unmolded, the first bearing seat 970 and the second bearing seat 975 will be ready to accept a bearing with no further machining required. In contrast, a molded long-strand carbon fiber is unable to conform to a small, high precision mold within the required tolerances to properly accept a bearing without further machining.

Advantageously, the hub shell 910 can be as strong as an aluminum hub shell but 40% lighter. Alternatively, the weight of the hub shell 910 can remain the same as an aluminum hub shell, yet be stronger. Advantageously, the hub shell 910 does not require additional machining to accept the bearings thereby reducing manufacturing costs.

Figure 10:
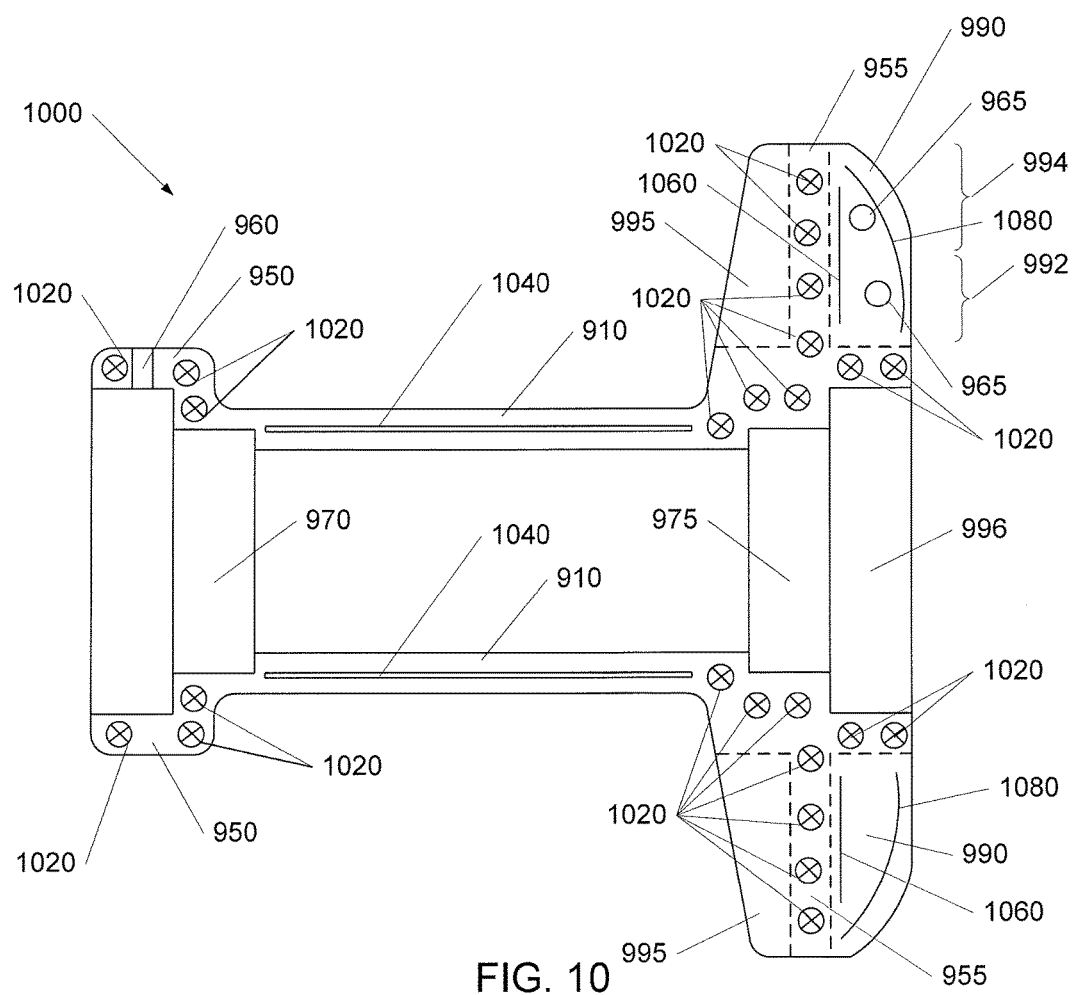
FIG. 10 is a section view of a reinforced hub shell in accordance with an illustrative embodiment.

Referring to FIG. 10, a section view of a reinforced hub shell 1000 in accordance with an illustrative embodiment is shown. The hub shell 1000 can include a hub shell body 910, a first spoke flange 950, and a second spoke flange 955, as described above. The first spoke flange 950 and the second spoke flange 955 can be located at the ends of the hub shell body 910. The first spoke flange 950 can include spoke holes 960. The second spoke flange 955 can include spoke holes 965.

The second spoke flange 955 can include first ribs 990 and second ribs 995. In one embodiment, the first ribs 990 and second ribs 995 can be aligned. In one embodiment, the spoke holes 965 can be located in the first ribs 990. The first ribs 990 can be curved like the blades of an impeller. In a first portion 992 of one of the first ribs 990, a first spoke can be attached at a first angle relative to the second spoke flange 955. In a second portion 994 of the one of the first ribs 990, a second spoke can be attached at a second angle relative to the second spoke flange 955. Alternatively, the first ribs 990 and second ribs 995 can be misaligned. In one embodiment, the spoke holes 965 can be located in the second ribs 995.

The hub shell 1000 can include a first bearing seat 970 and a second bearing seat 975. In one example, the outer race of a first bearing can mate with or form an interference fit with the first bearing seat 970; and the outer race of a second bearing can mate with or form an interference fit with the second bearing seat 975. Alternatively, the hub shell 900 can be configured to using a single bearing or multiple bearings.

In other embodiments, the bearing can be a taper bearing, a thrust bearing, or any other kind of bearing.

The hub shell 1000 can include a drive ring seat 996. A drive ring can be defined as a ring with teeth facing inwards and configure to interact with the pawls of a cassette body. The drive ring can be made of aluminum, steel, titanium, any other metal, or an alloy thereof. Alternatively, the drive ring can be a composite or ceramic. In one example, a drive ring can mate with, key into, or form an interference fit with the drive ring seat 996. Alternatively, the drive ring can be bonded into the drive ring seat 996. Alternatively, the drive ring can be co-molded with the hub shell 900. Alternatively, the drive ring can be molded as part of the hub shell 900; reinforcing materials and fillers can be placed in the drive ring section of the mold before compression molding to toughen the drive ring pawl contact surface and strengthen the area. In another embodiment, a molded drive ring (part of the hub shell 900) can be plated to toughen the pawl contact surface.

The hub shell 1000 can include fiber reinforcements. The hub shell 1000 can include annular reinforcements 1020, axial reinforcements 1040, radial reinforcements 1060, and/or curved radial reinforcements 1080. Each of the annular reinforcements 1020, axial reinforcements 1040, radial reinforcements 1060, and curved radial reinforcements 1080 can include unidirectional fibers. The annular reinforcements 1020, axial reinforcements 1040, radial reinforcements 1060, and curved radial reinforcements 1080 can be a bundle of unidirectional fibers, a sheet of unidirectional fibers, or combinations thereof. The annular reinforcements 1020 can be located, for example, in the first spoke flange 950 and the second spoke flange 955. The axial reinforcements 1040 can be, for example, located between and aligned between the first spoke flange 950 and the second spoke flange 955. The radial reinforcements 1060 can, for example, radiate from the axis of the hub shell 1000 and be located in first ribs 990. The curved radial reinforcements 1080 can, for example, radiate from the axis of the hub shell 1000, be located in first ribs 990, and curve around spoke holes 965. The annular reinforcements 1020, axial reinforcements 1040, radial reinforcements 1060, and curved radial reinforcements 1080 can be used in any part of the hub shell 1000 to provide structural reinforcement.

When the hub shell 910 and/or the ends of the hub shell are molded, the first bearing seat 970, the second bearing seat 975, and drive ring seat 996 mold features can be molded with a high precision mold configured according to a bearing manufacture's recommended bearing seat tolerances. When the resin and fiber chop are molded, the resin and fiber chop can flow into the precise features of the high precision mold. Thus, when the hub shell 910 is unmolded, the first bearing seat 970 and the second bearing seat 975 will be ready to accept a bearing with no further machining required. In contrast, a molded long-strand carbon fiber is unable to conform to a small, high precision mold within the required tolerances to properly accept a bearing without further machining.

Advantageously, the hub shell 1000 can be as strong as an aluminum hub shell but 40% lighter. Alternatively, the weight of the hub shell 1000 can remain the same as an aluminum hub shell, yet be stronger. Advantageously, the hub shell 1000 does not require additional machining to accept the bearings thereby reducing manufacturing costs.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus, comprising:
   a hub shell comprising:
      a hub body;
      a first spoke flange; and
      a second spoke flange;
   wherein:
      at least the first spoke flange and the second spoke flange comprise a fiber reinforced plastic; and
      the fiber reinforced plastic include fibers having a range of lengths between 0.2 and 3 inches;
   wherein:
      the second spoke flange comprise spoke holes;
      a bundle of continuous unidirectional fibers surround each of the spoke holes;
      the bundles of continuous unidirectional fibers are embedded in the fiber reinforced plastic including the fibers having the range of lengths between 0.2 and 3 inches;
      the second spoke flange comprises a first set of ribs on a drive side of the second spoke flange; and
      each rib of the first set of ribs is curved and comprises a first inner portion and a second outer portion such that a first spoke hole of the spoke holes located in the first inner portion is at a first angle and a second spoke hole of the spoke holes located in the second outer portion is at a second angle.

2. The apparatus of claim 1, wherein the fibers have an average length of about 2 inches.

3. The apparatus of claim 1, wherein a radius of the second spoke flange is about twice a radius of the hub body.

4. The apparatus of claim 1, wherein the first spoke flange comprises spoke holes.

5. The apparatus of claim 1, wherein the second spoke flange comprises a second set of ribs on a non-drive side of the second spoke flange.

6. The apparatus of claim 1, wherein the first set of ribs comprise spoke holes, and the spoke holes are perpendicular to an axis of the hub shell.

7. The apparatus of claim 1, wherein the second spoke flange is formed by compression molding.

8. The apparatus of claim 1, wherein the hub body comprises fiber reinforced plastic include fibers having a range of lengths between 0.2 and 3 inches.

9. The apparatus of claim 1, further comprising a bearing seat formed to accept a bearing without further machining, where the bearing seat has a tolerance of 0.5 mm or less.

10. The apparatus of claim 1, further comprising at least one of annular, axial, and radial fiber reinforcements.

11. The apparatus of claim 10, wherein the fiber reinforcements comprise unidirectional fiber.

* * * * *